United States Patent
Auernhammer

[11] 3,805,942
[45] Apr. 23, 1974

[54] SELECTIVE SYNCHRONOUS NON-SYNCHRONOUS TRANSFER MACHINE

[75] Inventor: Marcus J. Auernhammer, Detroit, Mich.

[73] Assignee: Visi-Trol Engineering Company, Detroit, Mich.

[22] Filed: Nov. 19, 1971

[21] Appl. No.: 200,444

[52] U.S. Cl. .................................. 198/19, 198/181
[51] Int. Cl. ............................................. B23q 5/22
[58] Field of Search ........... 198/19, 181; 104/172 R, 104/172 B

[56] References Cited
UNITED STATES PATENTS

| | | | |
|---|---|---|---|
| 3,504,781 | 4/1970 | Lehmann | 198/19 |
| 2,619,916 | 12/1952 | Rainier | 104/172 R |
| 3,666,076 | 5/1972 | Miller | 198/19 |
| 3,161,145 | 12/1964 | Cargill | 104/172 R |
| 2,883,943 | 4/1959 | Ingold | 104/172 R |
| 3,578,148 | 5/1971 | Pinckard | 198/181 |
| 3,550,755 | 12/1970 | Noren | 198/181 |

*Primary Examiner*—Richard E. Aegerter
*Attorney, Agent, or Firm*—Hauke, Gifford, Patalidis & Dumont

[57] ABSTRACT

A transfer machine having a continuous chain conveyor driven intermittently from a drive motor through a cam drive motion translator which alternately smoothly accelerates and decelerates the conveyor and then retains it in a stationary position for a dwell period of a selected interval.

Individual workpiece-carrying pallets are movable along a support rail above the path of motion of a plurality of sub-pallets carried by the conveyor chain. Each pallet has a slidably mounted latch which is engageable with the sub-pallets. A spring resiliently urges the latch toward engagement with the sub-pallets and a handle allows the user to disengage the latch from the sub-pallets.

In operation, each pallet engaged with a sub-pallet moves with the conveyor chain in its intermittent motion to successive stations along the support rail. A camming device is located at each station, and is actuated during each dwell period to disengage the latch of a pallet disposed in such station from the conveyor chain. Each pallet has a pivotal arm which can be actuated to prevent its latch from being engaged with the conveyor chain. The arm is disposed to sense the adjacent preceding pallet such that the latch of a moving pallet that approaches a stationary pallet cannot be engaged with the chain until the stationary pallet resumes its forward motion.

Solenoid actuators at selected work stations disengage each pallet from the conveyor and retain the pallet stationary for the period of time required for appropriate tooling to perform a work operation on the workpiece, after which the pallets are reengaged for pickup and transfer on the next conveyor movement.

Alternatively, some or all of the pallets may be frictionally engaged with the sub-pallets and are retained by any shot-pin or holding device at desired stations.

The pallets may be manually engaged with and disengaged from the conveyor by means of a handle provided on the latches.

The transfer machine can be made either entirely synchronous or entirely non-synchronous, or portions of the machine may be synchronous while other portions are non-synchronous by selective use of the solenoid actuators.

45 Claims, 16 Drawing Figures

PATENTED APR 23 1974  3,805,942
SHEET 1 OF 5
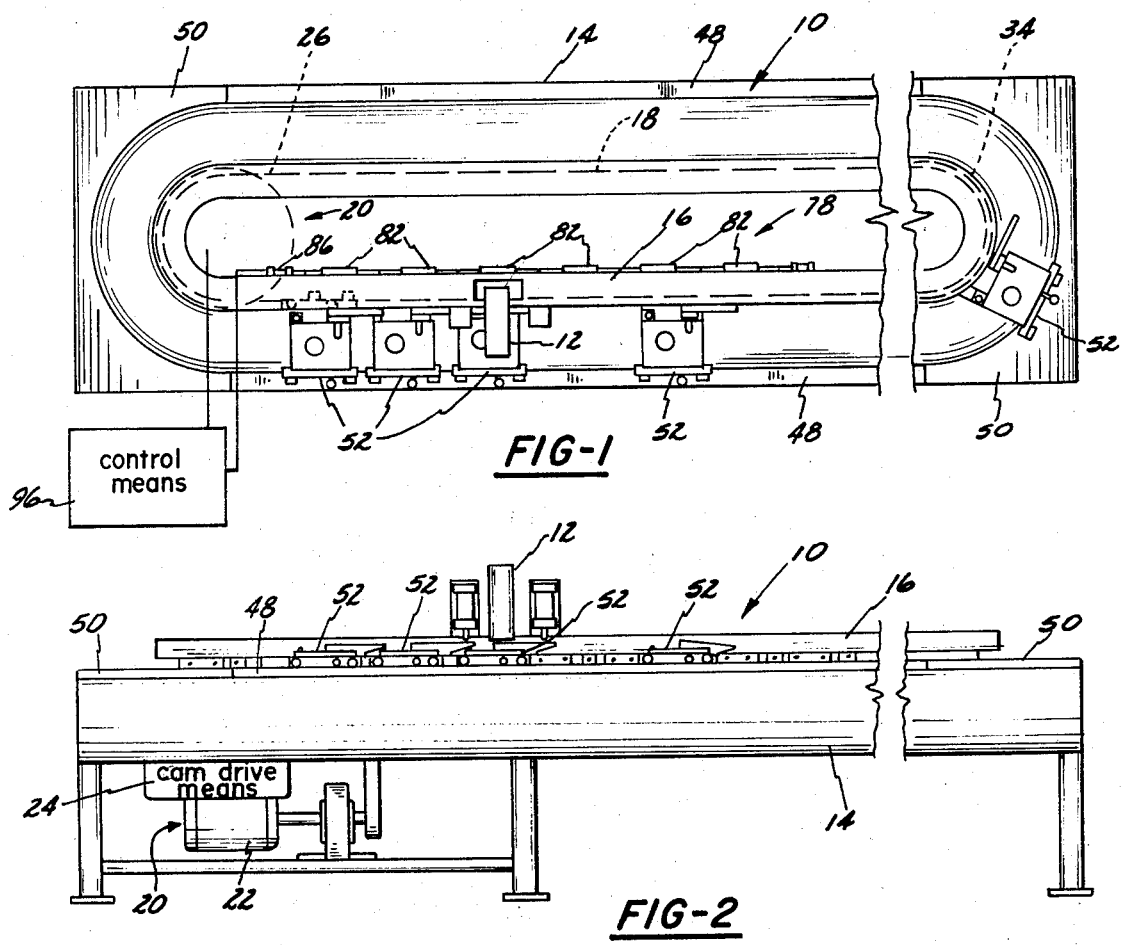
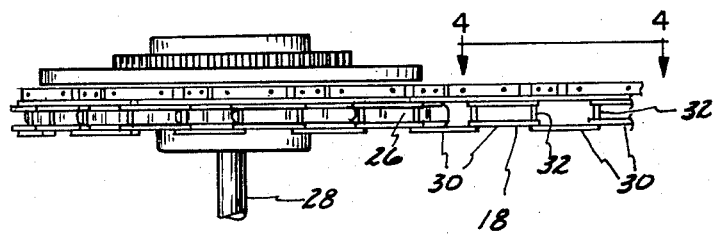
INVENTOR
Marcus J. Auernhammer
BY
Hauke Gifford & Patalidis
Attorneys INVENTOR
Marcus J. Auernhammer

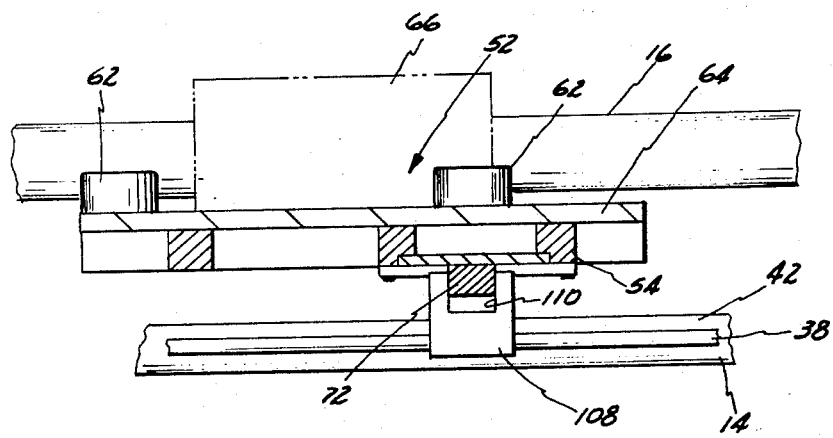
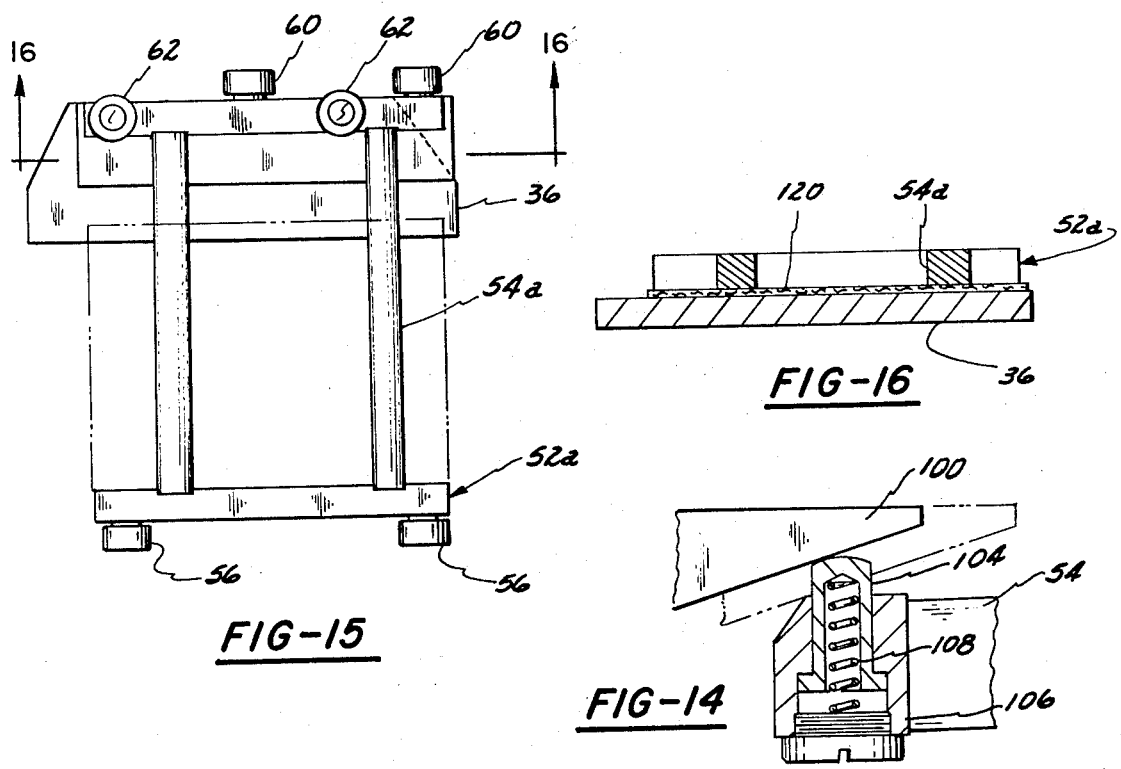

SELECTIVE SYNCHRONOUS NON-SYNCHRONOUS TRANSFER MACHINE

BACKGROUND OF THE INVENTION

1. Field of the Invention

The present invention relates to transfer machines of the continuous conveyor type in which work-holding pallets are moved by a conveyor chain between selected work stations.

2. Description of the Prior Art

Both synchronous and non-synchronous transfer machines are well known in the manufacturing industries. Synchronous transfer machines are those in which workpieces are carried between successive work stations at which appropriate tools perform work operations for a predetermined interval during which the workpieces are retained at the stations. All of the workpieces are moved simultaneously and intermittently by the conveyor. The disadvantages of such a machine is that the entire line must be operated according to the slowest work station, and timing of the other work operations must be carefully controlled. Further, there is no way in which work can be piled up ahead of a work station that might be temporarily out of order.

In recent years many types of non-synchronous transfer machines have been developed. In some such machines, the pallets which carry the workpieces are clutched to and declutched from a continuously moving conveyor chain. Successive pallets can be stacked up behind any given station by being declutched from the chain until space in the station becomes available. The problem with this type of system is that the back-up pallets tend to push through the work station. In addition, the clutching and declutching devices tend to wear out, and shock absorbing devices are required to absorb the stress of sudden clutching and declutching.

Some machines have been developed in which each pallet has its own driving motor, but these are generally expensive since each pallet must have its own control for starting and stopping.

Simpler systems have been developed in which a continuous chain frictionally drives the pallets which can stack up behind one another when the forwardmost pallet is held in position at a work station. Modifications of this system use idler rollers which are frictionally engaged by the conveyor chain.

Walking beam type of transfer machines have been developed in which the part-lifting and transferring elements of the machine are rendered inoperable as the parts tend to stack up.

SUMMARY OF THE INVENTION

The present transfer machine embodies the advantages of both synchronous and non-synchronous systems by providing a synchronously operating conveyor having work-holding pallets which are selectively disengageable from the conveyor drive means along selected portions of the conveyor's path of motion. In the present system, the conveyor has a plurality of adjacent sub-pallets carried by the conveyor chain. The work-holding pallets are movable along a support rail and have latching devices which are selectively engaged with the sub-pallets for movement by the conveyor between stations along the support rail.

At each station, a cam actuator disengages the latches when the conveyor is in a dwell period during an intermittent driving motion. Either the support rail or each pallet has a sensing arm which can be moved into a position holding the latch disengaged from the conveyor. The sensing arms may be actuated by solenoid actuators provided at a work station to release from the conveyor a pallet that is disposed in a work station. As a moving pallet approaches a stationary pallet in the work station, the sensing arm of the moving pallet prevents it from being advanced by the chain into the work station until the stationary pallet is again engaged with the conveyor.

An important feature of the present invention is that, by using the latch disengaging system along selected portions of the conveyor's path of motion, certain pallets can be moved synchronously with the conveyor while other pallets can be moved in a non-synchronous manner.

Alternatively, the latching devices may be eliminated and the pallets frictionally engaged with the sub-pallets carried by the conveyor, with pallets being retained as desired at any work station using any standard shot-pin or other stop device.

The preferred machine may be adapted so as to operate in either an entirely non-synchronous or an entirely synchronous manner, thus achieving in one transfer machine those features required in all types of transfer operations.

DESCRIPTION OF THE DRAWINGS

A more complete understanding of the invention may be had by reference to the accompanying drawings in which like reference characters refer to like parts throughout the several views and in which:

FIG. 1 is a diagrammatic top plan view of a preferred transfer machine embodying the present invention, with parts broken away for clarity and other parts shown schematically;

FIG. 2 is a front elevational view of the machine of FIG. 1;

FIG. 3 is an enlarged fragmentary elevational view of the chain drive of the preferred machine;

FIG. 13 is an enlarged cross-sectional view taken substantially along line 13—of FIG. 6;

FIG. 14 is a cross-sectional view of a poppet carried by each pallet for engaging the sensing arm of an approaching pallet;

FIG. 15 is a top plan view of a pallet illustrating another embodiment of the invention; and FIG. 16 is a cross-sectional view taken substantially along the line 15—15 of FIG. 14.

DESCRIPTION OF THE PREFERRED EMBODIMENTS

Figure 4:
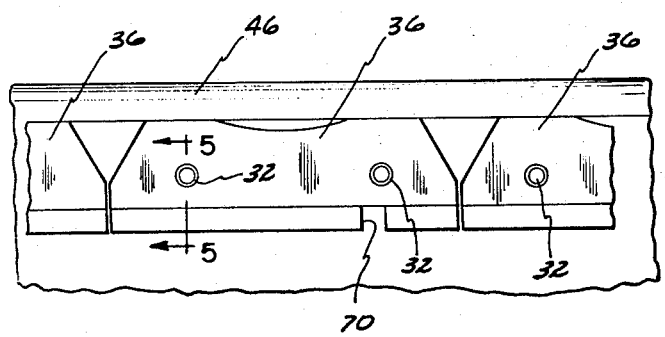
FIG. 4 is an enlarged plan view of sub-pallets connected to the chain of FIG. 3, as seen substantially from the line 4—4 thereof.

Referring to the drawings, a preferred transfer machine 10 is illustrated in FIGS. 1 and 2. For illustrative purposes, a single tooling station 12 is mounted on the transfer machine 10, however other appropriate tooling means can be mounted on or adjacent the transfer machine depending upon the nature of the work that is to be performed. Additional tooling stations are normally provided at other positions along the transfer machine 10.

Transfer machine 10 includes an elongated frame 14 having a support rail 16 in the shape of an elongated loop. Referring to FIGS. 1 and 3, the conveyor chain 18, also in the shape of an elongated loop, is mounted below the support rail 16. A drive means, generally indicated at 20, is mounted on one end of the frame 14 for moving the chain 18 along a path of motion adjacent the support rail 16.

The drive means 20 preferably includes a constant speed motor 22, which functions as a prime mover, connected to a motion translator 24. A sprocket 26 is mounted to an output shaft 28 of the motion translator 24, and is engaged with the chain 18 to drive it as the output shaft is rotated. The motion translator 24 receives a continuous input rotation from motor 22, and has a cam drive means or other preferred system between the motor and the output shaft 28 for driving the chain 18 in a cyclical motion in which the chain is accelerated from a stationary position to a selected velocity and then decelerated to a stationary position in which it is disposed for a dwell period of a selected interval. A preferred motion translator having selective acceleration and timing characteristics is available under the trademark "CAMCO" from Commercial Cam & Machine Company, 400 N. Ashland Avenue, Chicago, Ill. This type of drive and other drive systems which will drive the chain 18 in the synchronous motion described are well known to those skilled in the art and it is not necessary to show its details here.

Figure 5:
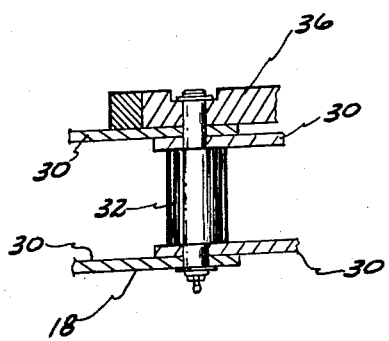
FIG. 5 is a cross-sectional view taken substantially along line 5—5 of FIG. 4.
Figure 6:
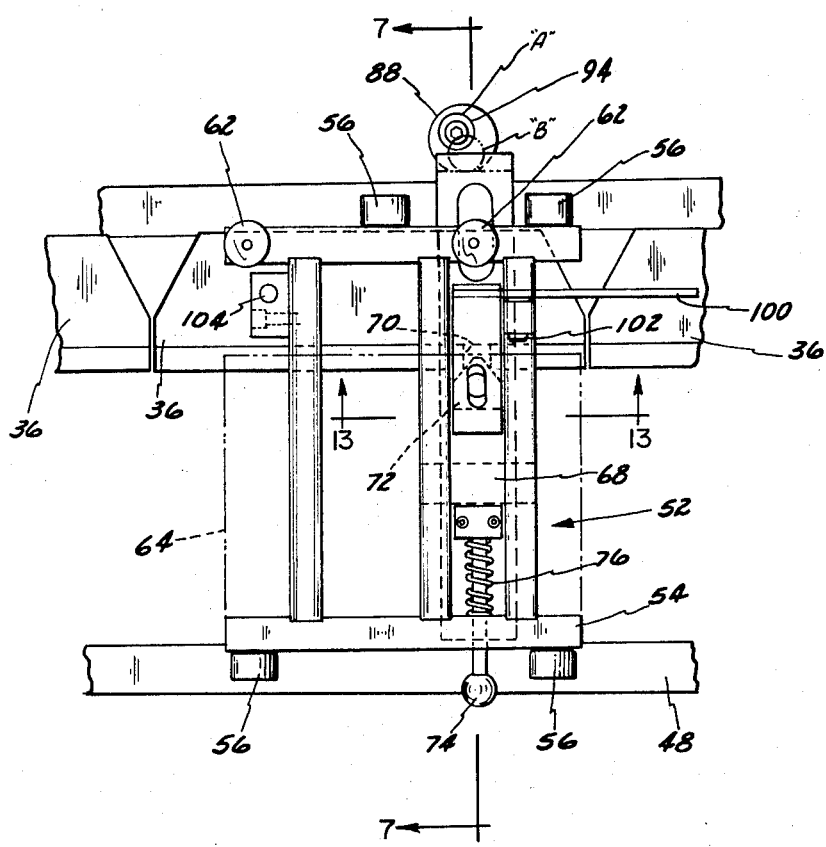
FIG. 6 is a fragmentary plan view of a work station showing a typical pallet.
Figure 7:
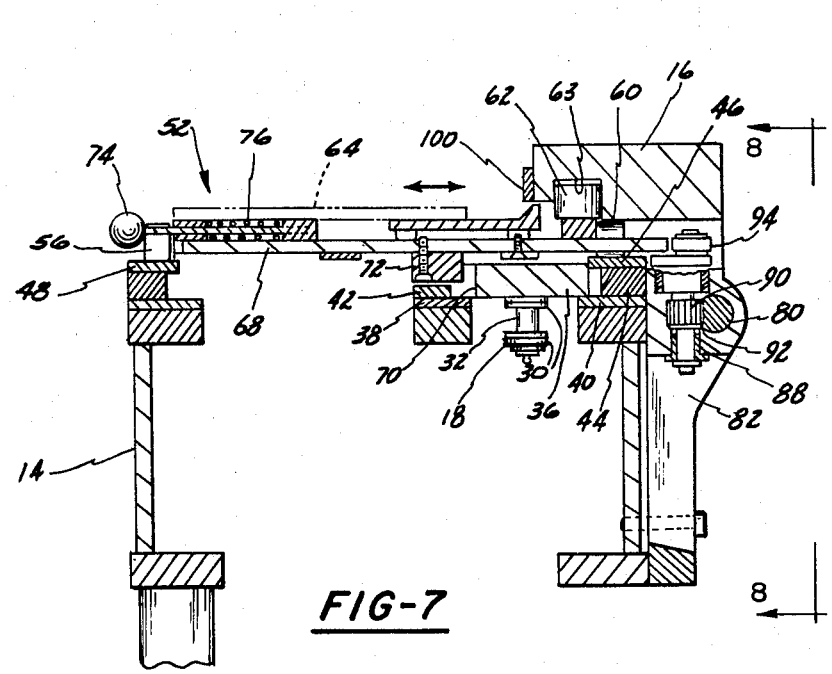
FIG. 7 is a cross-sectional view taken substantially along line 7—7 of FIG. 6.

Referring to FIGS. 3, 5 and 7, the chain 18 comprises pairs of spaced links 30 connected together by pins 32 such that adjacent links can pivot with respect to one another when engaged by either the drive sprocket 26 or an idler sprocket 34 mounted at the opposite end of the frame 14. A series of elongated sub-pallets 36, also shown in FIGS. 4 and 6, are carried by the chain 18, each sub-pallet being connected to the links 30 by the pins 32. As best shown in FIG. 7, the frame 14 has a pair of spaced ways 38 and 40 disposed on opposite sides of the path of motion of the chain 18. The lower edges of the long sides of each sub-pallet 36 are slidably mounted on the ways 38 and 40.

A pair of guides 42 and 44, mounted on the ways 38 and 40, respectively, are disposed on opposite sides of the path of motion of the sub-pallets 36 to prevent their being displaced transversely relative to the guides. A guide rail 46 is mounted on the guide 44 to form a channel for receiving the inner sides of the sub-pallets to prevent their being rotated about their longitudinal path of motion.

A second guide rail 48 is mounted on the frame 14 spaced apart from parallel to and at the same height as the guide rail 46. As best shown in FIG. 1, there is a guide rail 48 along each linear side spaced from the support rail 16, and a pair of end plates 50 are mounted on the frame 14 adjacent the ends of the guide rails 48 to form a continuous horizontal support surface.

Five work-holding pallets 52 are illustrated in various positions on the frame 14 for motion on the guide rails 46 and 48 in a path adjacent the support rail 16. Referring to FIGS. 6 and 7, each pallet 52 includes a frame 54 having a pair of rollers 56 for rolling support on the guide rail 48 and a second pair of rollers 60 for rolling support on the guide rail 46. A third pair of rollers 62, carried on the frame 54, are received in a longitudinal channel 63 in the support rail 16 to guide the pallet 52 along a path adjacent the support rail 16 and to prevent transverse motion of the pallet 52 with respect to such a path. A plate 64, carried on the pallet frame 54, is adapted to support a workpiece 66 as illustrated in phantom in FIG. 13.

Referring again to FIGS. 6 and 7, an elongated latch 68 is carried by the pallet frame 54 beneath the plate 64. The latch 68 is slidably mounted for motion transverse to the path of motion of the conveyor chain 18. As also shown in FIG. 4, each sub-pallet has a lateral opening 70. A detent 72, carried on the lower side of the latch 68, is receivable in a locking position in the sub-pallet opening 70 as shown in FIG. 6, in which position the pallet is movable with the chain 18. A handle 74 is preferably carried by the latch 68 so that a user may manually move the latch from its locking position to a release position in which the pallet 52 is disengaged from the sub-pallet 36. A spring 76 is carried as shown to urge the latch 68 toward its locking position.

Figure 8:
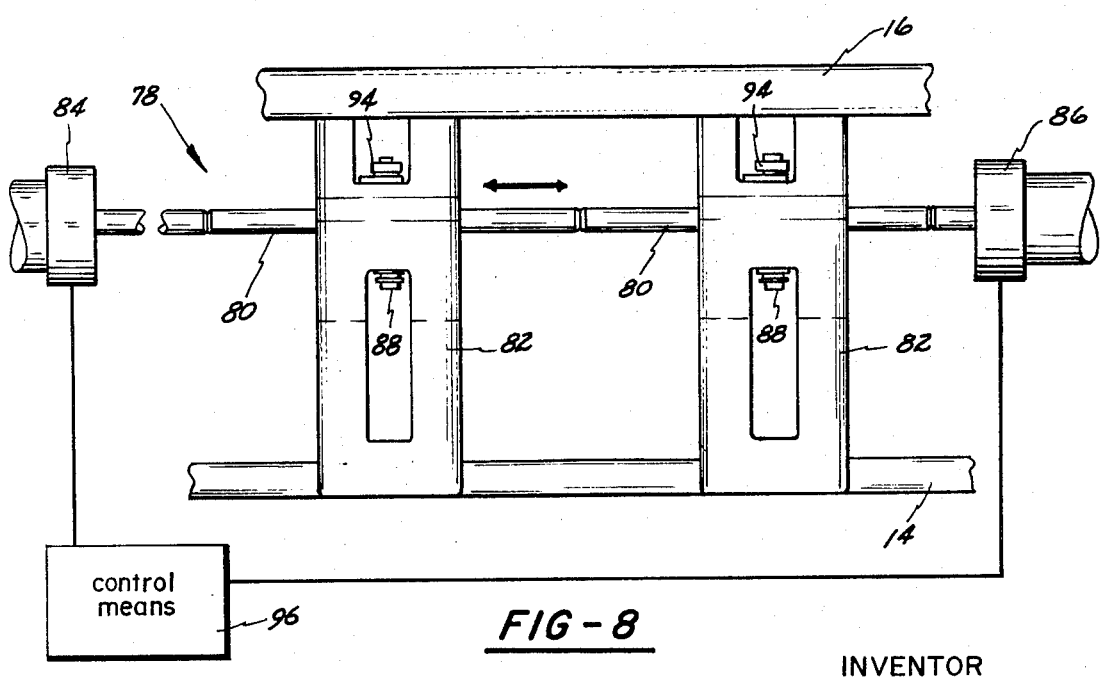
FIG. 8 illustrates a pair of work stations as seen substantially from the line 8—8 of FIG. 7.

As shown in FIGS. 1, 7 and 8, a cam actuator means 78 is mounted along one side of the support rail 16 to disengage those pallets 52 that are along the same side of the support rail during each dwell period of the drive means 20. The cam actuator means 78 includes a series of elongated racks 80 mounted end-to-end. A support member 82 mounted on the frame 14 supports each rack 80 for sliding motion parallel to the support rack 16. A pair of pneumatically operated actuators 84 and 86, or any other desired actuators, are mounted at opposite ends of the series of racks 80 to move them alternately in one direction, and then in the opposite direction during each dwell period of the drive means 20.

As best shown in FIG. 7, a pin 88 is mounted on the support 82 adjacent each rack 80. A pinion 90, carried on each pin, is engaged with teeth 92 of the rack 80 to rotate the pin 88 according to the direction of motion of the rack 80. A cam 94 is carried eccentrically on the upper end of the pin 88. The drive means 20 is adjusted to position a pallet 52 adjacent a support 82 such that the latch 68 is engageable with the cam 94. The cam 94 is movable with the pin 88 between a first position illustrated at "A" in FIG. 6, and a second position illustrated in phantom line at "B". As the pin 88 is rotated to move the cam 94 from its first position toward its second position, it is operable to cam the latch 68 from its locking position to its release position.

As indicated in FIGS. 1 and 8, any preferred control means 96 is connected between the drive means 20 and the actuators 84 and 86 for reciprocating same to rotate each cam 94 toward position B as the motion of the chain 18 is terminated to begin each dwell period, and to return the cams 94 toward position A before the chain has started to accelerate from its stationary position. Thus, the latch 68 of any pallet 52 positioned adjacent a cam 94 will be operatively disengaged from conveyor chain 18 only during its dwell period.

Figure 9:
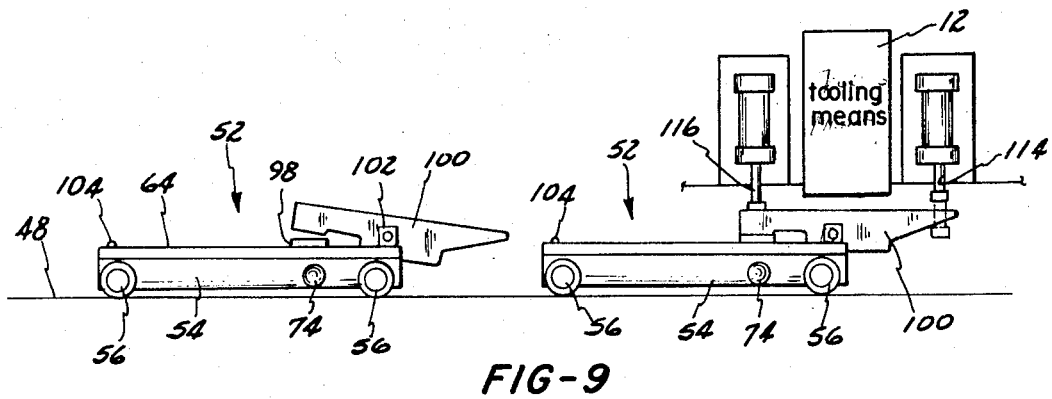
FIGS. 9 and 10 illustrate the manner in which the stationary pallet is sensed by the sensing arm of an approaching moving pallet.
Figure 11:
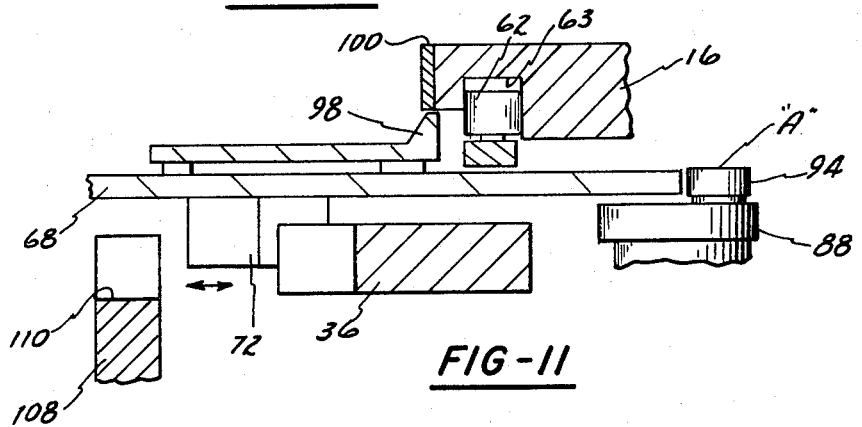
FIGS. 11 and 12 are enlarged sectional views that are transverse to the path of motion of the pallets to show the manner in which the sensing arm prevents the latch of a pallet from being engaged with the sub-pallets.

Referring to FIG. 11, a finger 98 is carried on the latch 68 so as to be disposed in a position adjacent the support rail 16 when the latch 68 is in its locking position. When the latch 68 is in its release position as in FIG. 12, an opening is formed between the finger 98 and the support rail 16. A sensing arm 100, also shown in FIGS. 6 and 9, is pivotally mounted by a pin 102 on each pallet 52 adjacent to the support rail 16, and has a tapered end that extends forwardly from the pallet on which it is mounted. The arm 100 is mounted such that its forward end is normally disposed in a lower position as shown in FIG. 9.

Figure 10:
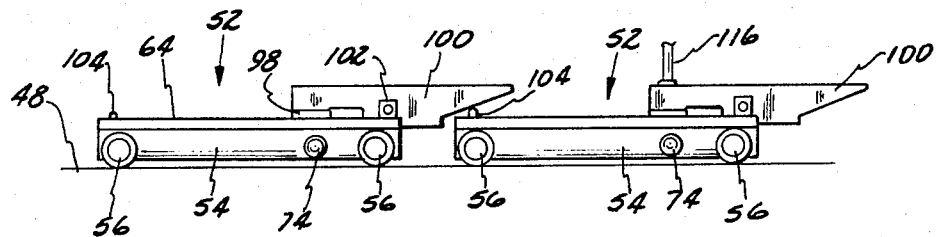

As best shown in FIGS. 9 and 11, the rearward end of the arm 100 is disposed above the path of motion of the finger 98 when the forward end of arm 100 is in its lower position. As the pallet approaches a preceding pallet, the forward end of the arm 100 engages a poppet 104 carried on the forward pallet. Referring to FIGS. 9, 10 and 14, the poppet 104 is movable in a housing 106 between extended and retracted positions. The pallet arm 100 cams the poppet 104 down into its housing as the rearward pallet approaches the preceding pallet. Subsequently, when the latch finger 98 is moved away from the support rail 16, a spring 108 extends the poppet 104 from the housing 106 and thereby pivots the rearward end of the arm 100 to the position shown in FIG. 12. In this position, the arm 100 prevents the detent 72 from being engaged with the sub-pallet 36 until the forward end of arm 100 is returned to its lower position. Thus, each following pallet is effectively disengaged from the conveyor when any preceding pallet is similarly disengaged and hence not moving with the conveyor, so that pallets will pile up behind any stationary pallet in non-synchronous operation.

Figure 12:
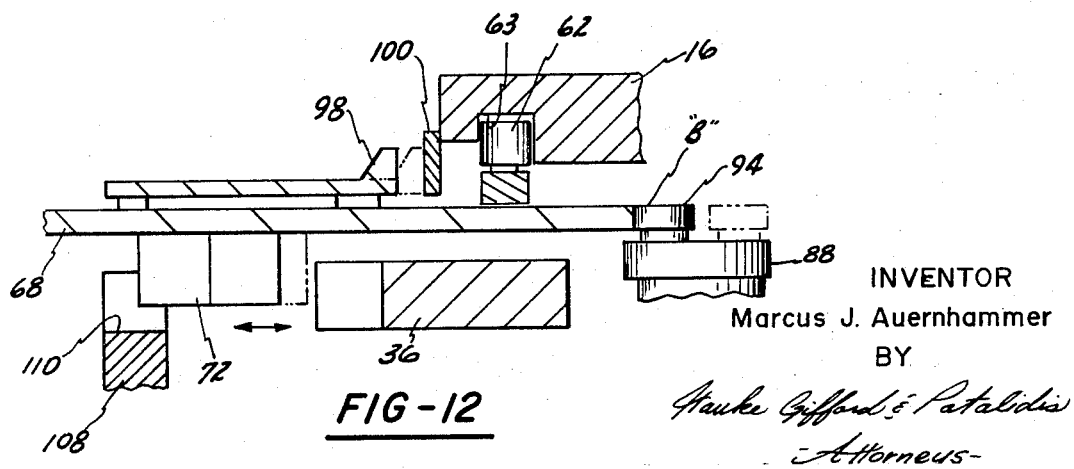

Referring to FIGS. 11 and 12, a retainer block 108 is mounted at selected work stations on the frame 14. Each block 108 has a slot 110 for receiving the detent 72. As the cam 94 moves the latch 68 toward its release position, the detent 72 is moved into the slot 110, so that the block 108 thereby prevents motion of pallet 52 along the support rail 16. Thus, the pallet is locked against horizontal motion as work is being performed on the workpiece 66.

It can be seen that as pallets 52 are driven by the conveyor chain 18 alongside the support rail 16, those pallets that are disposed adjacent the actuator means 78 are disengaged from the conveyor chain 18 during each dwell period, while the other pallets remain engaged with the conveyor chain. As the chain 18 continues its intermittent motion, the pallets that are engaged with the chain move with it in a synchronized motion.

The cam actuator means 78 operates to disengage the cams 94 from the latches 68 of the pallets 52 toward the end of each dwell period. Whether or not the latches 68 then move into engagement with the sub-pallets depends upon the position of the sensing arms 100. If the arm 100 blocks the motion of its latch 68, the pallet 52 supporting such an arm is not movable with the conveyor chain 18. Such pallets are therefore non-synchronous with respect to the chain 18.

There are several methods by which the pallets 52 can be disengaged from chain 18. For example, a user can move the handle 74 of a selected pallet to release its detent 72 from the sub-pallet 36.

Another method is illustrated in FIGS. 9 and 10. As each pallet 52 is moved into a work station adjacent the tooling means 12, the forward end of the arm 100 is disposed beneath a solenoid actuator 114 and the rearward end of arm 100 is disposed beneath a solenoid actuator 116. The solenoid actuator 116 lowers the rearward end of the arm 100 to retain the latch 68 disengaged from the sub-pallet 36 on the conveyor chain 18. After an appropriate interval has passed, the solenoid actuator 116 is raised from the arm 100 and the solenoid actuator 114 is energized to lower the forward end of arm 100, permitting the pallet latch 68 to be engaged with the sub-pallet 36 of the chain 18.

A third method is by disposing a forward pallet 52 in a stationary position adjacent the guide 16. As a rearward pallet 52 approaches the stationary pallet 52, the arm 100 of the rearward pallet 52 senses the presence of the stationary pallet 52 and prevents reengagement of the rearward pallet 52 with its sub-pallet 36 until such time as the preceding pallet continues its forward motion.

FIGS. 15 and 16 illustrate a modification of a pallet which may be used with the intermittently operating drive and conveyor chain heretofore described, but the pallets are simplified and the various latching devices are eliminated. As shown, a pallet 52a comprises a simplified frame 54a having secured to its lower surface a friction plate 120 which frictionally engages the upper surface of the sub-pallet 36. The rollers 60, carried by the frame 54a, since they ride under the guide 16, will operate to hold the friction plate 120 in contact with the sub-pallet 36. Thus, the pallets 52a will be carried along with the conveyor at all times that it is moving, except when any pallet 52a is held in a stationary position by any preferred means, such as a shot-pin or other stop device arranged at a work station. With a pallet 52a stopped at such a station, other pallets will pile up behind it and the sub-pallets 36 will slide beneath them. Such a system eliminates much of the expense of the non-synchronous operating mechanisms shown in FIGS. 1-13 and 16, but it is not as versatile. Pallets such as the one shown in FIGS. 15 and 16, however, may be used along with other latch carrying pallets, but it would be necessary in such a case to include a poppet 104 arrangement, such as that shown in FIG. 14, to cause any following pallets having the latch arrangements to become disengaged from its sub-pallet in the manner previously described.

Thus, it will be seen that a transfer machine has been described in which pallets in a selected portion of the machine may be moved in synchronous motion with the drive means, while pallets in another portion of the machine are not synchronized with the motion of the drive means, since selected pallets can be disengaged from synchronized motion with the drive means. In addition, the machine can be easily modified so as to be totally synchronized by deenergizing the cam actuator means, or selected portions of the machine can be adapted to be non-synchronous by mounting appropriate cam actuator means adjacent such portions.

I claim:

1. A transfer machine comprising:

a. a unidirectional closed loop conveyor including drive means operable to constantly intermittently drive said conveyor and to retain said conveyor in a stationary position for a dwell time of a selected period during those periods when the conveyor is not being driven, b. spaced apart guide rails extending adjacent and parallel to said conveyor, c. work-holding pallets adapted to move on said guide rails to successive stations therealong, and d. means for selectively engaging and disengaging said pallets with and from said conveyor only when said conveyor is in a stationary position during said dwell time to selectively intermittently move said pallets between said stations only when engaged with said conveyor.

2. The transfer machine as in claim 1 including means automatically actuating said engaging and disengaging means relative to the location of said pallets on said guide rails.

3. The transfer machine as in claim 2, and including means for selectively manually actuating said engaging and disengaging means irrespective of pallet locations or movement.

4. The transfer machine as in claim 3, and including means resiliently urging said engaging and disengaging means toward engagement of said pallets with said conveyor.

5. The transfer machine as in claim 1, including means retaining selected pallets disengaged from said conveyor.

6. The transfer machine as in claim 5, wherein said last mentioned means operates to retain a pallet disengaged which has moved into position adjacent a preceding disengaged pallet.

7. The transfer machine as in claim 1 wherein pallets located along one section of said guide rails are continuously engaged with said conveyor for continuous intermittent movement thereby and only pallets located along another section of said guide rails are selectively engaged and disengaged with and from said conveyor.

8. The transfer machine as in claim 1, and including means retaining pallets located along one section of said guide rails continuously engaged with said conveyor for continuous intermittent movement thereby.

9. The transfer machine as in claim 1, and including a sensor element engaged by a pallet moved into position adjacent a preceding pallet and operable to retain such moved pallet disengaged from said conveyor so long as said adjacent preceding pallet remains stationary.

10. The transfer machine as in claim 9, wherein said sensor means comprises arm elements carried by said rails and each extend between two adjacent stations to which succeeding pallets are movable.

11. The transfer machine as in claim 9, wherein said sensor means comprises an arm element carried by each pallet and extending toward the station which may be occupied by an adjacent pallet and engageable thereby to operate to retain an adjacent following pallet disengaged from said conveyor.

12. The transfer mechanism as in claim 1, a. first guide elements operable to guide said conveyor along a defined path, and b. second guide elements operable to guide said pallets along a defined path parallel to said conveyor whereby to ensure positive movement of pallets engaged with said conveyor.

13. The transfer machine as in claim 12, wherein a. said pallets comprise support plates extending transversely between said guide rails and having rollers supported for movement thereon.

14. The transfer machine as in claim 13, wherein at least one of said rails has means retaining said rollers against transverse or rotated displacement.

15. The transfer machine as in claim 1, and including means resiliently urging said engaging and disengaging means toward engagement of said pallets with said conveyor.

16. A transfer machine comprising:

a. a constantly intermittently moving conveyor including drive means for same, b. spaced apart guide rails extending adjacent and parallel to said conveyor, c. work-holding pallets adapted to move on said guide rails to successive stations therealong, d. means selectively engaging and disengaging said pallets with and from said conveyor to selectively move said pallets between said stations, e. each pallet having a latch element engagable with said conveyor, and f. said engaging and disengaging means comprising actuators positioned at selected stations along said rail and operably connected with said conveyor drive means to actuate to disengaged positions those latch elements of pallets located at said stations only during dwell of said conveyor between movements thereof.

17. The transfer machine as in claim 16, wherein said conveyor carries detent elements spaced therealong and engageable by said pallet latch elements to connect said pallets for movement with said conveyor, and including sensor means engaged by pallets moved into positions adjacent preceding pallets and operable to engage said latch elements of such moved pallets for retaining same disengaged from said detent elements so long as adjacent preceding pallets remain stationary.

18. The transfer machine as in claim 17, wherein said sensor means comprises arm elements carried by said rails and each extend between two adjacent stations to which succeeding pallets are movable.

19. The transfer machine as in claim 17, wherein said sensor means comprises an arm element carried by each pallet and extending toward the station which may be occupied by an adjacent pallet and engageable thereby to operate to retain an adjacent following pallet latch element disengaged from said conveyor detent elements.

20. The transfer machine as in claim 17, and including means for selectively manually disengaging said latch elements from said detent elements irrespective of pallet locations or motion.

21. The transfer machine as in claim 17, and including means resiliently relatively urging said latch and detent elements toward engagement.

22. The transfer machine as in claim 16, and including retainer means positioned at selected stations and selectively operable to move to positions retaining disengaged said latch elements of said pallets located at such selected stations.

23. The transfer machine as in claim 22, wherein said retainer means comprises arm elements carried by said rails and actuating means selectively operable to move said arm elements to positions interfering with engaging movement of said latch elements.

24. The transfer machine as in claim 16, wherein said conveyor drive means comprises:
   a. a substantially constant speed prime mover,
   b. a motion translator having input means continuously driven by said prime mover, output means drivingly connected with said conveyor and said actuators, and cam drive means intermediate said input and output means and operable to drivingly accelerate said output means from zero to a selected output speed and subsequently decelerate said output means to zero, and to retain said output means at zero for a predetermined dwell period.

25. The transfer machine as in claim 16, and including means for selectively manually disengaging said latch elements from said conveyor irrespective of pallet locations or movement.

26. The transfer machine as in claim 16, and including means resiliently urging said latch elements toward engaged positions.

27. A transfer machine comprising:
   a. a constantly intermittently moving conveyor including drive means for same,
   b. spaced apart guide rails extending adjacent and parallel to said conveyor,
   c. work-holding pallets adapted to move on said guide rails to successive stations therealong,
   d. means selectively engaging and disengaging said pallets with and from said conveyor to selectively move said pallets between said stations,
   e. first guide elements operable to guide said conveyor along a defined path,
   f. second guide elements operable to guide said pallets along a defined path parallel to said conveyor whereby to ensure positive movement of pallets engaged with said conveyor,
   g. each pallet having a latch element movable on an axis disposed normal to said conveyor and pallet paths,
   h. said conveyor carrying detent elements spaced therealong at locations intersecting the axes of adjacent pallets and engageable by said pallet latch elements to connect said pallets for movement with said conveyor, and
   i. said engaging and disengaging means comprising actuators positioned at selected stations along said rail intersecting selected latch and detent axes when said conveyor is in dwell between movements, and said actuators being operably connected with said conveyor drive means to actuate to disengaged positions those latch elements of pallets located at said stations only during dwell of said conveyor.

28. The transfer machine as in claim 27, and including sensor arm elements extending parallel to said conveyor and pallet paths, said arm elements being engaged by pallets moving to stations adjacent preceding pallets and operable to retain the latch elements of such moved pallets disengaged from said conveyor detents so long as said adjacent preceding pallet latch elements are disengaged from said conveyor detents.

29. The transfer machine as in claim 28, wherein said sensor arm elements are carried by said rail and each extend between two adjacent stations.

30. The transfer machine as in claim 28, wherein said sensor arm elements are carried by said pallets and each extends toward a station which may be occupied by an adjacent pallet and are engageable thereby to operate to retain the latch element of an adjacent following pallet disengaged from said conveyor detents.

31. The transfer machine as in claim 27, and including means for selectively manually disengaging said latch elements from said detent elements irrespective of pallet locations or motion.

32. The transfer machine as in claim 27, and including means resiliently relatively urging said latch and detent elements toward engagement.

33. The transfer machine as in claim 27, wherein said conveyor drive means comprises
   a. a substantially constant speed prime mover,
   b. a motion translator having input means continuously driven by said prime mover, output means drivingly connected with said conveyor and said actuators, and cam drive means intermediate said input and output means and operable to drivingly accelerate said output means from zero to a selected output speed and subsequently decelerate said output means to zero, and to retain said output means at zero for a predetermined dwell period.

34. A transfer machine comprising:
   a. an unidirectional closed loop conveyor including means for constantly intermittently moving same,
   b. spaced apart guide rails extending adjacent and parallel to said conveyor,
   c. work-holding pallets adapted to move on said guide rails to successive stations therealong,
   d. means selectively engaging and disengaging said pallets with and from said conveyor to selectively intermittently move said pallets between said stations only when engaged with said conveyor,
   e. first guide elements operable to guide said conveyor along a defined path,
   f. second guide elements operable to guide said conveyor along a defined path parallel to said conveyor whereby to insure positive movement of pallets engaged with said conveyor,
   g. said conveyor comprising a continuous chain having separate adjacent sub-pallets secured thereto,
   h. said first guide elements comprising members retaining said chain and said sub-pallets against transverse or rotated displacement during movement through said stations, and
   i. said engaging and disengaging means comprising latch elements selectively connecting said pallets and sub-pallets.

35. The transfer machine as in claim 34, and including means resiliently urging said latch elements toward positions connecting said pallets and sub-pallets.

36. A transfer machine comprising:
   a. a constantly intermittently moving conveyor including drive means for same,
   b. spaced apart guide rails extending adjacent and parallel to said conveyor,
   c. work-holding pallets adapted to move on said guide rails to successive stations therealong, d. means selectively engaging and disengaging said pallets with and from said conveyor to selectively move said pallets between said stations, e. said conveyor comprising a continuous chain having separated adjacent sub-pallets secured thereto, f. said pallets overlying said sub-pallets, and g. said pallets having depending latch elements for selective connection with said sub-pallets.

37. The transfer machine as in claim 36, wherein said engaging and disengaging means comprises actuators positioned at selected stations along said rails and operably connected with said conveyor drive means to actuate to disengaged positions those latch elements of pallets located at said stations only during dwell of said conveyor between movements thereof.

38. The transfer machine as in claim 37, and including retainer means positioned at selected stations and selectively operable to move to positions retaining disengaged said latch elements of said pallets located at such selected stations.

39. The transfer machine as in claim 38, wherein said retainer means comprises arm elements carried by said rails and actuating means selectively operable to move said arm elements to positions interfering with engaging movement of said latch elements.

40. The transfer machine as in claim 38, wherein said retainer means comprises an arm element carried by each pallet and actuating means selectively operable to move said arm elements to positions interfering with engaging movement of said latch elements.

41. The transfer machine as in claim 40, wherein said retainer means comprises an arm element carried by each pallet and actuating means selectively operable to move said arm elements to positions interfering with engaging movement of said latch elements.

42. The transfer machine as in claim 37, wherein said conveyor drive means comprises a. a substantially constant speed prime mover, b. a motion translator having input means continuously driven by said prime mover, output means drivingly connected with said conveyor and said actuators, and cam drive means intermediate said input and output means and operable to drivingly accelerate said output means from zero to a selected output speed and subsequently decelerate said output means to zero, and to retain said output means at zero for a predetermined dwell period.

43. The transfer machine as in claim 37, and including means for selectively manually disengaging said latch elements from said sub-pallets irrespective of pallet locations or motion.

44. The transfer machine as in claim 36, and including means resiliently urging said latch elements toward connection with said sub-pallets.

45. A transfer machine comprising:

a. a constantly intermittently moving conveyor including drive means for same, b. spaced apart guide rails extending adjacent and parallel to said conveyor, c. work-holding pallets adapted to move on said guide rails to successive stations therealong, d. means selectively engaging and disengaging said pallets with and from said conveyor to selectively move said pallets between said stations, and e. said conveyor drive means comprising a substantially constant speed prime mover, a motion translator having input means continuously driven by said prime mover, output means drivingly connected with said conveyor, and cam drive means intermediate said input and output means and operable to drivingly accelerate said output means from zero to a selected output speed and subsequently decelerate said output means to zero, and to retain said output means at zero for a predetermined dwell period.

* * * * *

UNITED STATES PATENT OFFICE
CERTIFICATE OF CORRECTION

Patent No. 3,805,942          Dated April 23, 1974

Inventor(s)   Marcus J. Auernhammer

It is certified that error appears in the above-identified patent and that said Letters Patent are hereby corrected as shown below:

In the Abstract, line 24, "the" should read -- an --.
Column 2, line 64, after "13" insert -- -13 --. Column 4, line 44, "rack" should read -- rail --. Column 7, line 65, after "1" insert -- further comprising --.

Signed and sealed this 15th day of October 1974.

(SEAL)
Attest:

McCOY M. GIBSON JR.                C. MARSHALL DANN
Attesting Officer                  Commissioner of Patents